United States Patent [19]

Cornwell, Jr.

[11] 4,389,694

[45] Jun. 21, 1983

[54] CABLE CONTINUITY MONITORING SYSTEM

[75] Inventor: Robert Cornwell, Jr., Bluefield, W. Va.

[73] Assignee: PEMCO Corporation, Bluefield, W. Va.

[21] Appl. No.: 195,117

[22] Filed: Oct. 8, 1980

[51] Int. Cl.$^3$ ............................................. H02H 5/10
[52] U.S. Cl. ...................................... 361/48; 361/47; 324/51; 340/652
[58] Field of Search ................................... 361/47–50; 324/51; 340/652, 649

[56] References Cited

U.S. PATENT DOCUMENTS

| | | | |
|---|---|---|---|
| 3,676,739 | 7/1972 | Neuhouser | 361/48 |
| 3,995,200 | 11/1976 | Stolarczyk | 361/48 |
| 4,075,675 | 2/1978 | Burkett et al. | 361/48 |
| 4,080,642 | 3/1978 | Stolarczyk | 361/47 |
| 4,153,923 | 5/1979 | Graf | 361/48 |
| 4,228,475 | 10/1980 | Sherwood | 361/47 |

*Primary Examiner*—Patrick R. Salce
*Attorney, Agent, or Firm*—Mason, Fenwick & Lawrence

[57] ABSTRACT

There is disclosed a monitoring system for insuring the continuity and integrity of a power distribution system comprising a plurality of trailing cables, each trailing cable connected at a central station to a common power source and transmitting a power energizing signal to a load disposed at a remote location. In particular, the monitoring system comprises a transmitter and receiver for each trailing cable of the power distribution system whereby a monitoring signal is transmitted from the central station to the remote location and returned to be detected by the receiver. If there is a fault condition within the trailing cable, the receiver provides a signal indicative thereof to be applied to a circuit breaker or coupling switch actuating the coupling switch to its open position thereby disconnecting the power from the trailing cable and its load. When a monitoring signal is successively transmitted and detected, the receiver provides a manifestation indicating the integrity and continuity of its trailing cable and actuates its coupling switch to its closed position, thus applying an energizing signal via its conductor to the load. The transmitter dedicated to each trailing cable includes means responsive to the frequency or frequencies of the previously generated monitoring signals, even from other transmitters, for generating a monitoring signal of substantially the same frequency whereby the monitoring signals as applied via the common AC power bus will be of substantially the same frequency. As a result, the monitoring system of this invention tends to eliminate the production of difference or beat signals and the resultant false indications of a fault condition within one or more of the trailing cables.

13 Claims, 7 Drawing Figures

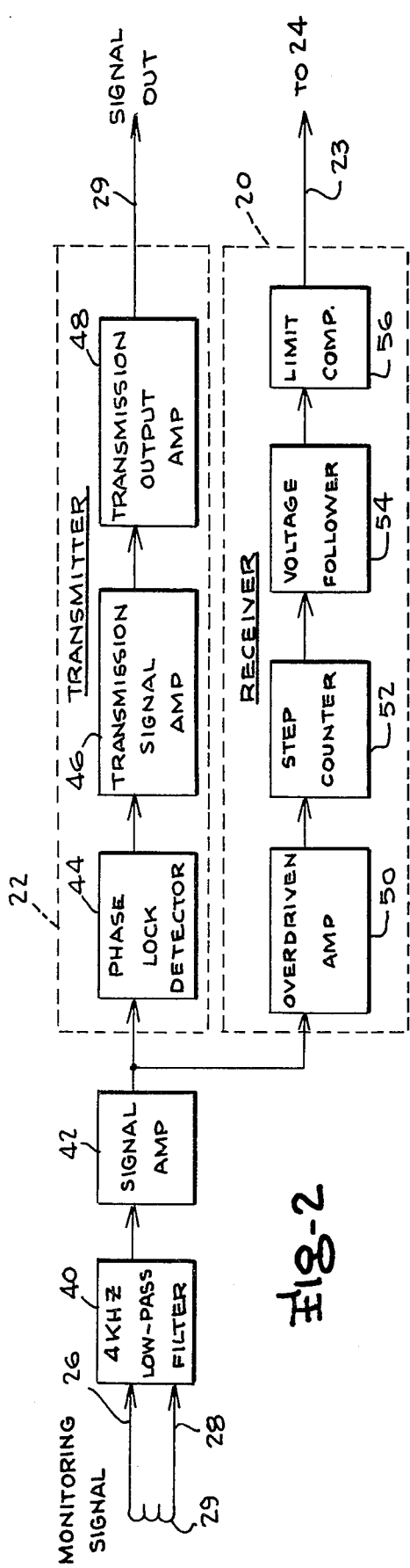
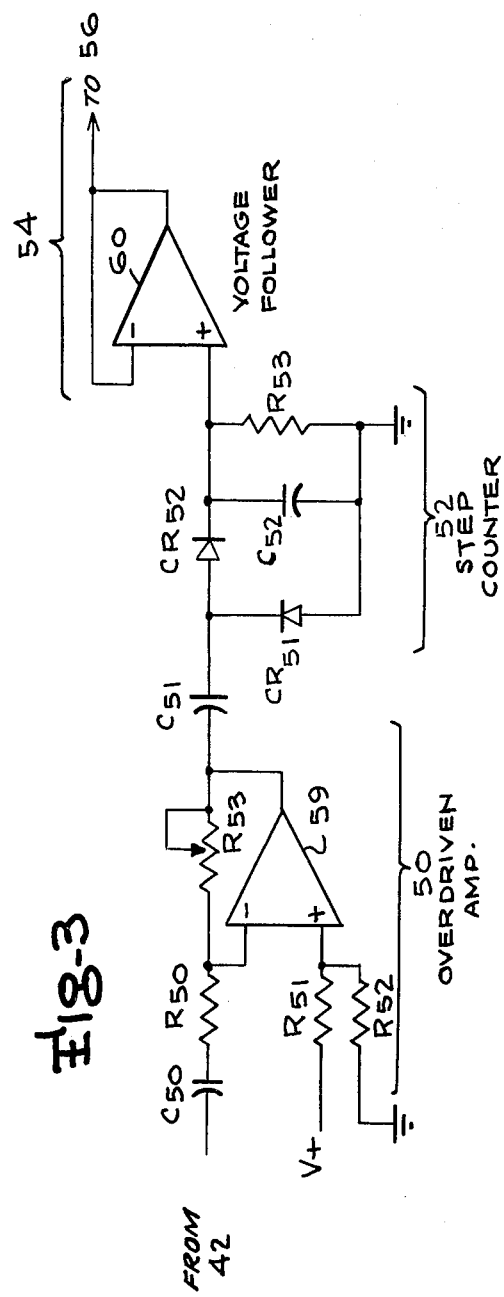
Fig-2
Fig-3

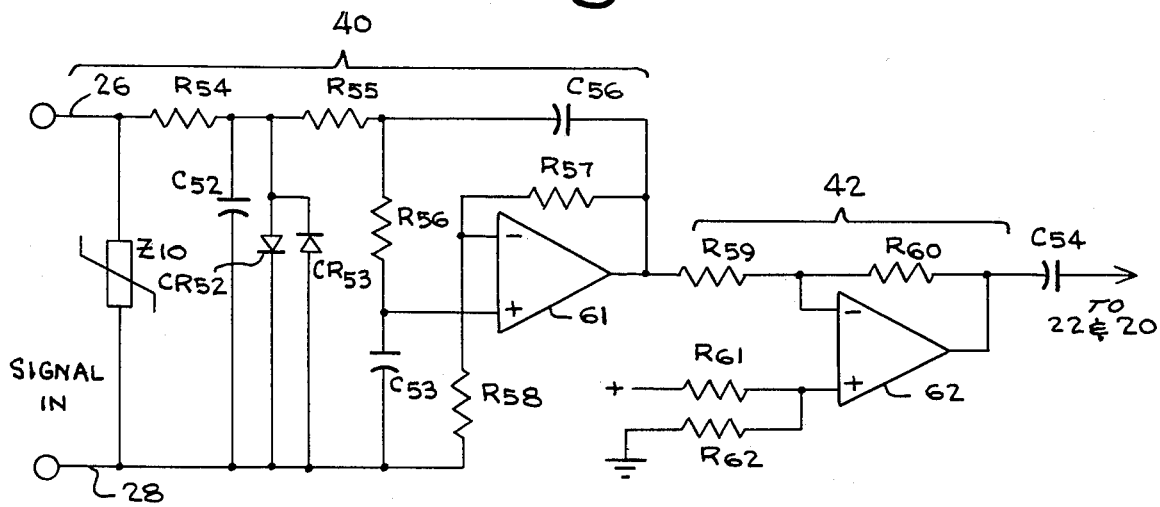
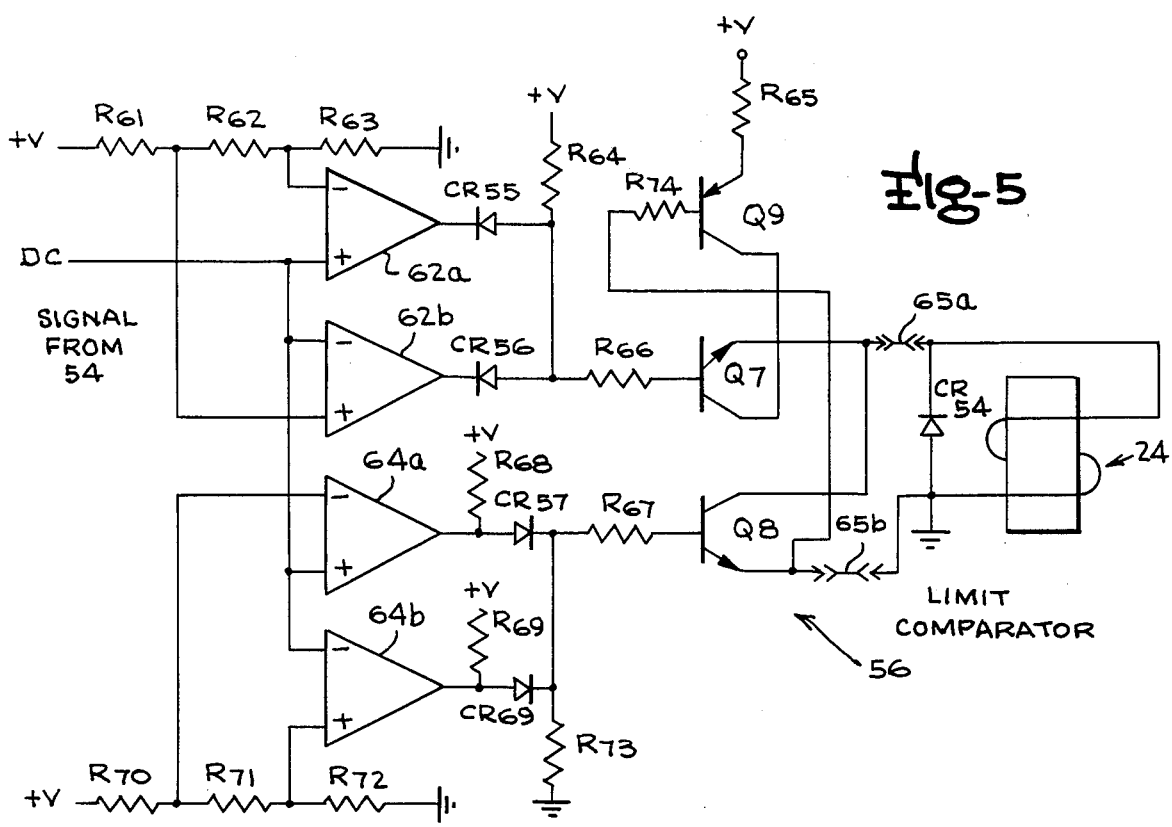

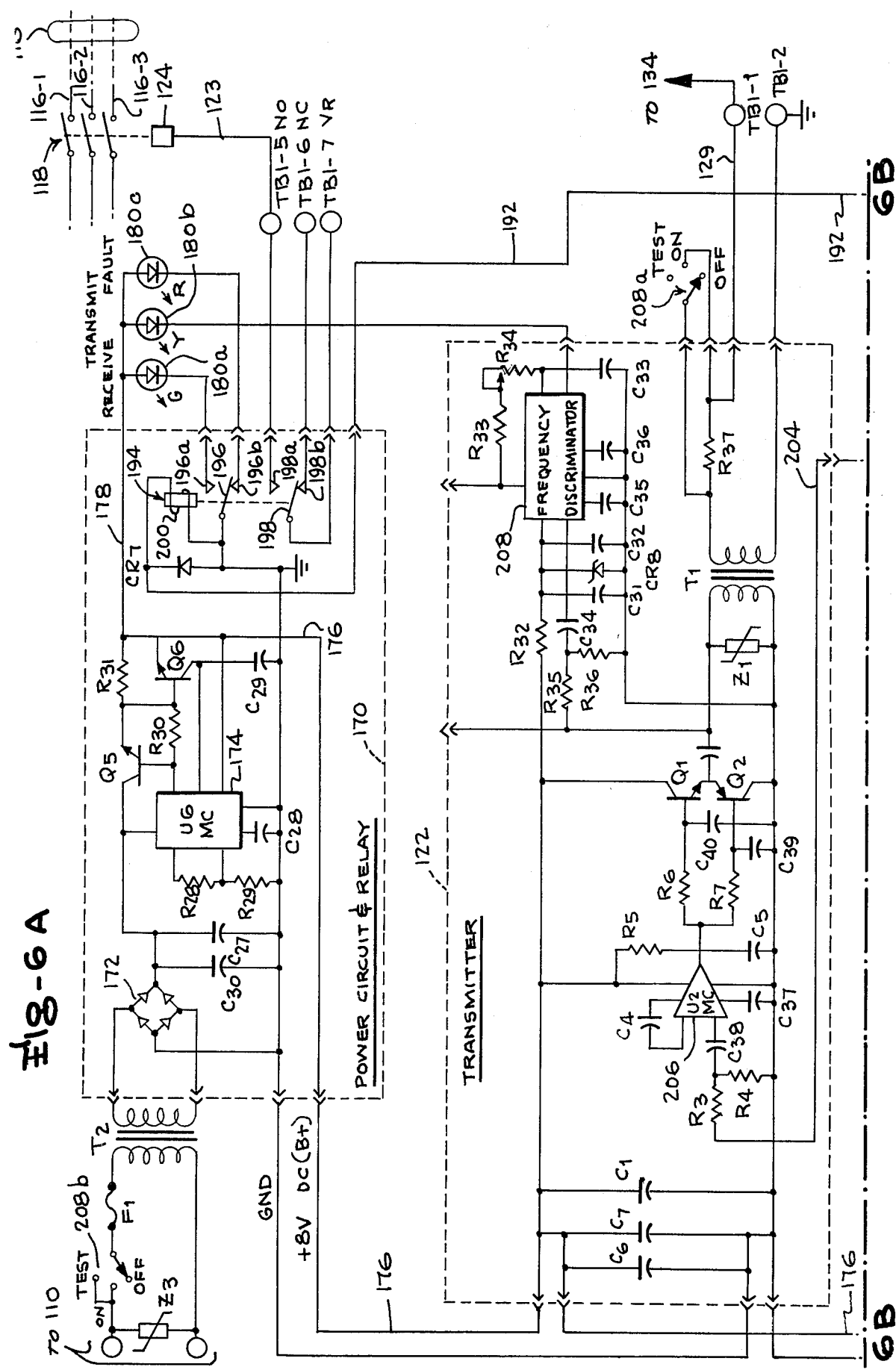

CABLE CONTINUITY MONITORING SYSTEM

DESCRIPTION

Background of Prior Art

This invention relates to cable monitoring systems, and in particular to such systems for insuring the integrity of such cables as are used to energize equipment, e.g., mining equipment, as employed in remote and/or dangerous locations.

In the prior art, mining extracting equipment was employed at remote locations from a centrally located power source for digging and extracting coal from a mine's vein. To energize such equipment, AC power is supplied to the mobile mining machines through multiconductor trailing cables which extend from the remote location, typically within the bowels of the mine, to a power source disposed at a central location, e.g., at an opening into the mine. Each of the trailing cables comprises a plurality, e.g., three, of conductors for carrying three phase alternating current (AC) to the mining machine. The trailing cables extend to a remote point which may be 500 to 5,000 feet or more from the mining machine where it is coupled to the power source. It is apparent that there is a danger that the trailing cable can be damaged to cause an open or short circuit in the conductors of the cable which would cause arcing of the high voltage conductors and thereby create a serious explosion hazard in the presence of volatile gases found in the mine. Where it is desired to minimize the possibility that a damaged trailing cable will cause arcing, the trailing cable will normally include a ground wire in the form of a grounded sheath above the cable or of a separate conductor in the cable. The ground wire connects the frame of the mobile machine positively to a ground at or near the power source.

To prevent hazards from shock at the mobile machines, the integrity of the ground wire must be maintained. Because of the environment in which the mobile machines operate, the ground wire is subject to damage and to faulty connection at the machine. If one of the current carrying conductors is shorted to the mining machine frame after the ground conductor breaks or its connection becomes faulty, a dangerously high voltage exists at the machine frame and could harm mine personnel.

For these reasons, a continuous reliable ground continuity monitoring system must be provided for each mobile machine. Various systems to monitor the condition of the ground wire connecting the mining machine to ground have been devised. Some monitoring systems include an extra conductor or pilot wire in the cable. A signal is provided to the remote machinery over the extra conductor and a different signal is transmitted back from the remote machinery through the ground wire. Systems using an extra conductor are exemplified by the monitoring circuits of U.S. Pat. No. 3,335,324 of Buckeridge, issued on Aug. 8, 1967 and U.S. Pat. No. 3,496,416 of Agnew, issued on Feb. 17, 1970. Buckeridge uses both ground and pilot wires between the circuit breaker switch and his mining machine. Direct current in the monitoring circuit generated by a diode at the mining machine from the AC power supply current provides operating current for a circuit breaker switch connecting the AC power source to its trailing cable. A fault in the ground wire releases the switch terminating power to the mining machine. In the Agnew system, U.S. Pat. No. 3,496,416, a signal is sent over a pair of monitoring conductors in the trailing cable to the mining machine. If there is continuity in the monitoring conductors, a signal transmitter is energized at the vehicle which transmits a signal to the source of power over the same conductors. Requiring the use of additional conductors or pilot wires increases the expense of the system and may cause false operation of the monitoring system and unnecessary shut down of the equipment if the pilot wire should break while the ground wire remains intact. Also, the Agnew system requires a separate transmitter on each mining vehicle.

Examples of monitoring systems which do not use an extra conductor other than the ground wire include the apparatus of U.S. Pat. No. 3,728,582 of Agnew, issued on Apr. 17, 1973, U.S. Pat. No. 3,729,653 of Manoff, issued on Apr. 24, 1973, and U.S. pat. No. 3,895,264 of Kirilloff issued on July 15, 1975.

In the system of U.S. Pat. No. 3,728,582, the main power source is disconnected from its trailing cable when the apparent resistance of a conductor and the ground wire exceeds a given value. Sensing the reflected impedance between the ground wire and another conductor of the trailing cable requires a transmitter circuit for each trailing cable in a multi-cable system. Each monitoring circuit must be isolated from other monitoring circuits operating in the system from the same power source.

The monitoring apparatus of U.S. Pat. No. 3,895,264 utilizes a star arrangement of impedances connected at the power source and at the mobile machine to provide a monitoring voltage which circulates current through the ground wire and a monitoring impedance. One disadvantage of this system is that an impedance such as a solid state breakdown device must be inserted into the ground wire before it is grounded.

In the system of U.S. Pat. No. 3,729,653, a DC signal is impressed on the ground wire by a transmitter on the mobile machine. When the current in the ground wire falls below a predetermined level, a relay is deenergized disconnecting the power source from the mobile machine. In this system, a transmitter must be provided for each mobile machine. A diode bridge is required between the ground wire and the system ground. Access to the transmitter is limited because of its location upon the mobile machine rather than near the system power source.

In the system in U.S. Pat. No. 3,729,653, a DC signal is applied to the ground wire coupled to the mobile machine. Such systems also suffer the disadvantage in that they typically require large amounts of power and place a relatively high voltage on their ground wire. In addition, such systems may fail to detect an open circuit condition should a breaker discontinuity in the ground wire occur. This is due to the fact that the earth, especially earth in which minerals such as coal are deposited, present an alternate path for the DC signal to take from the load through the earth to the receiver of the monitoring circuit.

In addition, other prior art systems have been subject to detecting false open or short circuit conditions. Typically, a receiver relay in the monitoring circuit senses that the monitoring signal, or particularly its current, falls below a predetermined level so as to inadvertently detect an open circuit ground condition to actuate an alarm and to open the circuit breaker or power coupling switch connecting the power source to a trailing cable. Sometimes such a condition may be falsely presented in that a shunt parallel circuit from the machine or load back to ground may occur, for example, when a second mining machine frame touches the frame of the one being monitored, thereby creating a parallel ground path back to the ground at the load.

In the system of U.S. Pat. No. 4,075,675 of Burkett et al, an AC monitoring signal is transmitted by a transmitter disposed at the mining machine via a ground wire to be detected by a receiver disposed at the centrally disposed power source; the detector provides an alarm in the absence of the monitoring signal. In particular, the receiver of the Burkett et al U.S. Pat. No. 4,075,675 discloses the use of a band pass filter for passing only signals within a frequency range centered upon the frequency of the transmitted monitoring signal, to be applied to a transistor amplifier, which in the absence of the inputted monitoring signal actuates its coupling switch to disconnect the power source and the conductors of the trailing cable, thus deenergizing the remotely disposed machine load.

In the system of U.S. Pat. No. 4,011,486 of Oulton, there is disclosed a system wherein a monitoring signal is transmitted from a remote location over conductors, not power conductors as discussed above but telephone lines used for conveying data to a remotely located computer or computer terminal, wherein the monitoring signal is transmitted from the remote location to a central location to check the continuity and integrity of the communication lines therebetween. The transmitted and received signal is passed through a band pass filter to reject all frequencies except those of a narrow band centered on the predetermined frequency of the transmitted monitoring signal and is thereafter applied to a phase locked loop to determine whether the received signal is within a predetermined frequency range and, if not, to provide an output to operate a relay to disconnect the receive line and the transmit line from a piece of equipment, e.g., a computer, at the remote location.

In the system of U.S. Pat. No. 4,153,923 of Graf, there is disclosed a system for monitoring the continuity of the ground wire and conductors of a trailing cable interconnecting a common power source and a machine, illustratively a mining machine, disposed at a remote location within a mining environment. A single transmitter supplies a monitoring signal to a plurality of trailing cables to be transmitted over each to be coupled by the mining machine to a ground wire and to be returned through the ground wire of each trailing cable to the central station where a current transformer couples the returned monitoring signal to a receiver, each of the trailing cables and mining machines having its own receiver. The receiver senses the monitoring signal as to whether the frequency of the returned monitoring signal is within a predetermined range and above a predetermined level by the use of a pair of parallel connected, phase locked loop discriminators. Each of the parallel connected, phase locked loop discriminators is connected to a corresponding one of first and second switches, the first and second switches in the form of transistors being connected in series together. This arrangement of the switches and phase locked loop discriminators provides a redundancy whereby if one of the discriminators should malfunction, the breaker or coupling switch interconnecting the power source and the trailing cable will be opened. The use of but a single transmitter for a plurality of cables and mining machines presents the problem in that if the single transmitter fails, each of the mining machines protected by such a monitoring system will be deenergized whereby a costly delay is incurred in terms of lost man hours until the transmitter is repaired and a potential health hazard is imposed upon the people working in the mines.

Thus, it is desired to employ a receiver for each trailing cable and load, e.g., mining machine. In such a monitoring system, each of the plurality of trailing cables comprises, illustratively, three conductors which are in turn coupled to a common three phase power bus located at the power source or central station. Further, there is included in the contemplated monitoring system, a plurality of transmitters, each transmitting a monitored signal at a selected frequency, e.g., 4.1 kHz. Due to variations in manufacture of the transmitters and the three phase filters coupling the outputs of each of the transmitters of its trailing cable, the frequency of the monitored signals may vary slightly as it is transmitted and returned. When more than one such monitoring system is connected to the common three phase power bus, the monitoring signals generated by the plurality of transmitters may tend to compete with each other thus producing beat or different signals, i.e., a signal whose frequency is the difference between the varied frequencies of the monitored signals. As a result, the beat or different signals may trigger a warning circuit within one or more of the receivers whereby a false indication of an open or short circuit condition in the trailing cables is provided and, additionally, the coupling switch interconnecting the common power bus and its trailing cable is opened.

Brief Summary of the Invention

Thus it is an object of the invention to provide a monitoring signal for an electrical conductor to insure, with a high degree of reliability, the continuity and the integrity of the conductor.

It is a more specific object of this invention to provide a monitoring system for a plurality of like cables wherein the possibility that a false indication of a fault condition within any of the cables will be diminished.

It is a further object of this invention to provide a new and improved monitoring system wherein there is provided a transmitter and receiver dedicated to each cable, and the transmitted and received monitoring signal upon one cable will not produce difference or beat signals with those monitored signals as transmitted and received over the other cables of the monitoring system.

In accordance with these and other objects of this invention, there is provided a monitoring system for insuring the continuity and integrity of a power distribution system comprising a plurality of trailing cables, each trailing cable connected at a central station to a common power source and transmitting a power energizing signal to a load disposed at a remote location. In particular, the monitoring system comprises a transmitter and receiver for each trailing cable of the power distribution system whereby a monitoring signal is transmitted from the central station to the remote location and returned to be detected by the receiver. If there is a fault condition within the trailing cable, the receiver provides a signal indicative thereof to be applied to a circuit breaker or coupling switch actuating the coupling switch to its open position thereby disconnecting the power from the trailing cable and its load. When a monitoring signal is successively transmitted and detected, the receiver provides a manifestation indicating the integrity and continuity of its trailing cable and actuating its coupling switch to its closed position, thus applying an energizing signal via its cable to the load. In accordance with the teachings of this invention, the transmitter dedicated to each trailing cable includes means responsive to the frequency of frequencies of the previously generated monitoring signals, even from other transmitters, for generating a monitoring signal of substantially the same frequency whereby the monitoring signals as applied via the common AC power bus will be of substantially the same frequency. As a result, the monitoring system of this invention tends to eliminate the production of difference or beat signals and the resultant false indications of circuit condition within one or more of the trailing cables.

In one aspect of this invention, there is included within either the transmitter or receiver a phase lock detector circuit responsive to the monitoring signals appearing on the common AC power bus and each of the sets of trailing cables to provide a reference signal of a frequency that is phase locked to the frequency of these monitoring signals whereby the frequency of the monitoring signals as generated on each of the plurality of trailing cables will be phase locked with each other and thus, substantially equal with each other.

In one illustrative embodiment of this invention, the receiver includes the phase locked detector circuit and is coupled to receive the returned monitoring signals. In such an embodiment, the phase locked detector circuit functions to both detect the successful transmission and return of its monitoring signal, and also to provide a reference signal that is phase locked to the frequency of the monitoring signal appearing on the common AC power bus and each of the trailing cables, the reference signal being applied to the transmitter for subsequently transmitting the monitoring signal.

In a further embodiment of this invention, the receiver includes a circuit for determining whether the amplitude of the received monitoring signal is above a predetermined level and further for converting the received monitoring signal to a DC output signal whose level or amplitude is dependent upon the frequency of the received monitoring signal when the amplitude is above the predetermined level. The DC output signal is in turn applied to a limit comparator circuit that compares the DC signal to the first and second predetermined levels corresponding to the upper and lower frequencies of the desired range and if within the desired range, provides an output indicative thereof. In particular, the comparator circuit may take the form of first and second pairs of comparator circuits, each pair of comparator circuits biased to detect the aforementioned first and second levels, respectively. Each pair of comparator circuits is in turn connected to a switch in the form of a transistor, the transistors being coupled in parallel with a power switch coupling the common AC power bus and its trailing cable. If either of the switches associated with a corresponding one of the pairs of operational amplifiers is rendered conductive, the conductive switch is deenergized and power is disconnected from its trailing cable.

BRIEF DESCRIPTION OF THE DRAWINGS

These and other objects and advantages of the present invention will become more apparent by referring to the following detailed description and the accompanying drawings, in which:

FIG. 2 is a functional block diagram of a monitoring system including a transmitter and a receiver, in accordance with one embodiment of this invention, for each of the trailing cables as shown in FIG. 1;

FIG. 3 is a detailed circuit diagram of the overdriven amplifier, the step counter, and the voltage follower of the receiver, as more generally shown in the functional block diagrams of FIGS. 1 and 2;

FIG. 4 is a detailed circuit diagram of the elements of the transmitter as shown in functional block diagram of FIGS. 1 and 2;

FIG. 5 is a detailed circuit diagram of the limit comparator as shown in the functional block diagram of FIG. 2.

DETAILED DESCRIPTION OF THE INVENTION

Figure 1:
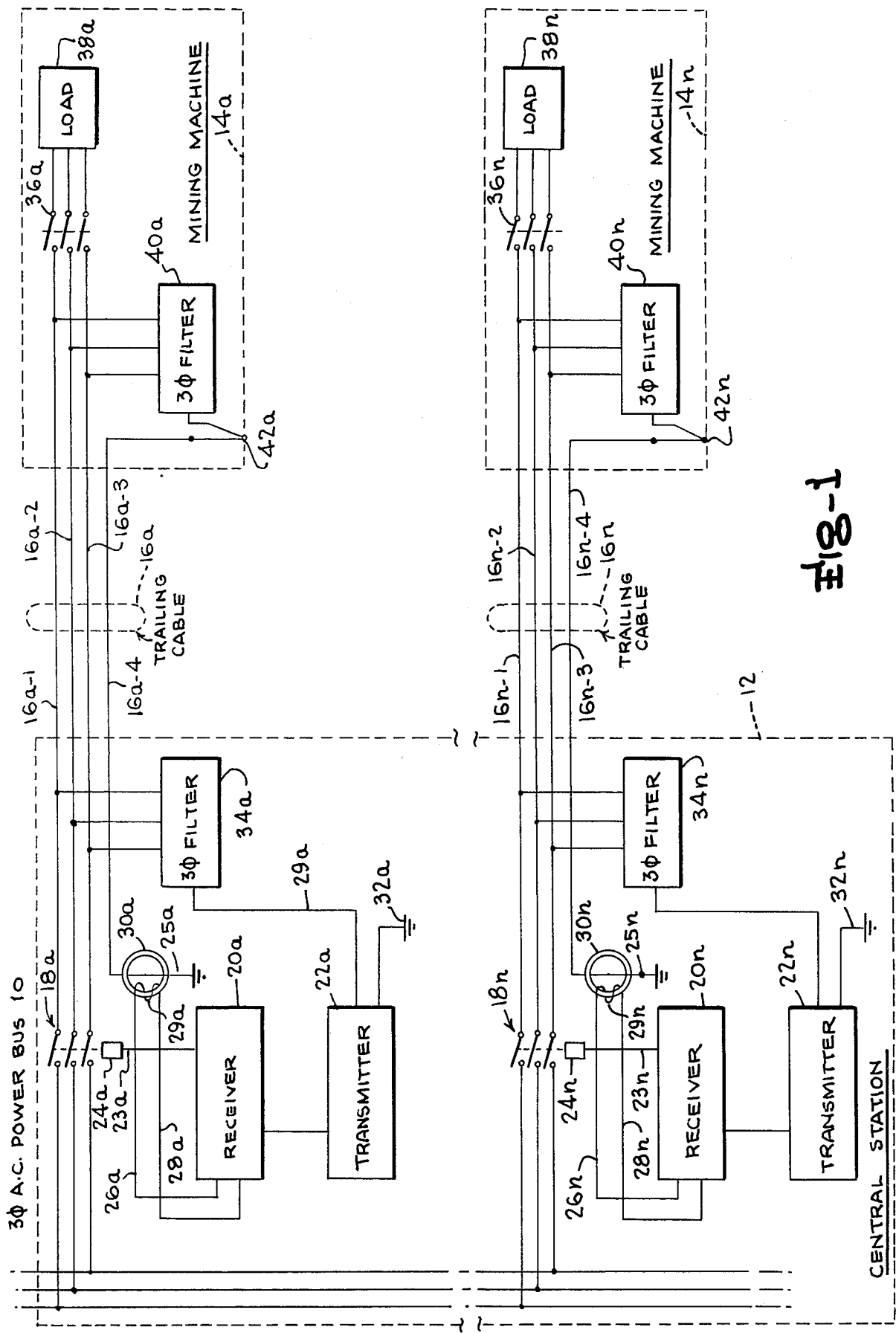
FIG. 1 is a functional block diagram showing a power distribution system including a plurality of cables and a system for monitoring the integrity and continuity of each of the aforementioned cables in accordance with the teachings of this invention.

Referring now to the drawings, and in particular to FIG. 1, a central station or power center 12 supplies three phase AC power as derived from a three phase AC power bus 10 to each of a plurality of trailing cables 16a through 16n. There is shown in FIG. 1, a first trailing cable 16a comprised of power conductors 16a-1, 16a-2, and 16a-3, and an nth trailing cable 16n comprised of conductors 16n-1, 16n-2, and 16n-3. Conductors 16a-1, 16a-2, and 16a-3 and 16n-1, 16n-2, and 16n-3 are connected to the electrical loads 38a and 38n through switches 36a and 36n of mining machines 14a and 14n, respectively. The trailing cables 16a and 16n also include ground wires 16a-4 and 16n-4 to positively connect each mining machine frame to ground at the central station 12. Ground wire 16a-4 is electrically connected to the frame of its mining machine 14a at frame ground 42a. The opposite end of ground wire 16a-4 is electrically grounded at ground 25a of the central station 12. Similarly, ground wire 16n is connected at grounds 42a and 25n.

For safe mining machine operation, the integrity of the ground wire of each trailing cable 16a–16n must be maintained to positively connect the mining machine frame to ground, and the integrity of the power conductors must be maintained to avoid additional hazards. To continuously monitor the power distribution system, a transmitter 22 is provided for each of the trailing cables 16 and loads 38 for generating a monitoring signal at a frequency above the AC power line frequency, e.g. 60 Hz. The monitoring signal is coupled via line 29a via a three phase filter 34a to conductors 16a-1, 16a-2, and 16a-3 of the trailing cable 16a. The monitoring signal travels over these conductors to the mining machine 14a, where three phase filter 40a couples the signal from these conductors to the frame of the machine 14a and to ground wire 16a-4. The monitoring signal travels back to the central station 12 over the ground wire 16a-4 to the ground 25a. Before being grounded at the central station 12, ground wire 16a-4 passes through current transformer 30a which picks off the monitoring signal from the ground wire 16a-4. The second output lead from the transmitter 22a is frame grounded to the central station 10 at point 32a to complete the monitoring signal path. Current transformer 30a couples the monitoring signal to the receiver 26a over lines 26a and 28a. Upon successful receipt of a monitoring signal of proper amplitude and frequency, the receiver 20a provides an output to a power coupling switch 18a to energize a solenoid 24a and to close the contacts of the power switch 18a thus supplying AC power over the conductors 16a-1, 16a-2, and 16a-3 to the mining machine 14a. Should the monitoring signal received at the receiver 20a fall below a given amplitude or deviate in frequency beyond a predetermined range of frequencies, the power coupling switch 18a will open, shutting off power to mining machine 14a. As shown in FIG. 1, there is included a plurality of receivers 20, transmitters 22, trailing cables 16, and mining machines 14. Such a monitoring system also includes the transmitter 22n, which transmits a monitoring signal via its three phase filter 34n to power conductors 16n-1, 16n-2, and 16n-3 of cable 16n. The three phase filter 40n at the machine 14a couples the monitoring signal to machine frame ground 42n so that the monitoring signal returns along ground conductor 16n-4 and is coupled to the receiver 20n by lines 26n and 28n connected to transformer 30n. If the monitoring signal is successfully transmitted and returned over trailing cable 16, the power switch 18n is closed by the output signal from receiver 20n and remains closed so long as a monitoring signal of the proper amplitude and frequency is detected by receiver 20n. While FIG. 1 shows the system monitoring two machines, a substantial number of additional machines can be monitored. Each additional mining machine will, of course, have a trailing cable 16, a transmitter 22, and a receiver 20. In accordance with the teachings of this invention, each such monitoring system includes its own transmitter 22 for generating and transmitting a monitoring signal whose frequency is phase locked to the frequency of the monitoring signals as transmitted by the other transmitters 22.

FIG. 2 shows an illustrative embodiment of the receiver 20 and transmitter 22, as generally shown in FIG. 1. In particular, the monitoring signal as transmitted and returned via the ground wire 16-4 passes through the current transformer 30. As shown in FIGS. 1 and 2, a secondary coil 29 is inductively coupled to the current transformer 30 and applies a signal having the approximate shape of a varying sine wave via conductors 26 and 28 to a low pass filter 40 which passes without attenuation signals of a frequency below 4.1 kHz to a signal amplifier 42. As shown in FIG. 2, the amplified and filtered monitoring signal is applied to each of the transmitter 22 and receiver 20. In the transmitter 22, the amplified and filtered monitoring signal is detected by a phase lock detector 44 to provide an output reference signal whose frequency is phase locked to the frequency of the received monitoring signal. The reference signal is successively amplified and coupled, respectively, by the signal amplifier 46 and the output amplifier 48 and applied via conductor 29 to the three phase filter 34, as shown in FIG. 1, whereby the monitoring signal is applied and transmitted via the trailing cable 16 and its conductors 16-1, 16-2, and 16-3 to the mining machine 14. In an illustrative embodiment of the invention, the transmitter signal amplifier 46 and the transmitter output amplifier 48 may take the form of the elements of the transmitter as more fully disclosed in FIG. 6. In particular, the transmitter signal amplifier 46 may take the form of an operational amplifier 206 and, correspondingly, the transmitter amplifier 48 may take the form of the push-pull coupled transistors Q1 and Q2; the amplifier 46 and 48 are biased and interconnected by the circuit elements, as illustratively shown in FIG. 6. Briefly, the operational amplifier 46 provides substantially unity gain and isolation between the phase locked detector 44 and the transmitter output amplifier 48; in turn, the transmitter output amplifier 48 provides power gain dependent upon the load imposed thereon by the trailing cable 16 and the coupled load 38.

It is understood that each transmitter 22 includes its phase lock detector 44 whereby its frequency reference signal and thus the frequency of the monitoring signal as generated by the transmitter 22 is phase locked to the frequency of the monitoring signals as transmitted by its receiver 20 as well as the transmitters associated with the other mining machines 14 and coupled to its trailing cable by the three phase AC power bus 10. As a result, the frequency of the monitoring signals as generated by the plurality of transmitters and the frequency of the reference signal (and its resultant monitoring signal) as generated by the phase lock detectors 44 are phase locked with each other. As a result, the frequency of the monitoring signals appearing on the AC common bus 10 and each of the sets of trailing cables 16 will be phase locked with each other. As a result, the frequency of each of the monitoring signals imposed on the power distribution system will be substantially the same and, as a result, no different or beat signals will be produced that may tend to give rise to a false indication of an open circuit or short circuit condition within one of the trailing cables 16. In an illustrative embodiment of this invention, the phase lock detector 44 may illustratively take the form of an integrated circuit as manufactured by the National Semiconductor Company under their designation LM567. Typically, such a phase lock detector 44 is designed to detect whether the filtered and amplified monitoring signal is of sufficient amplitude and is within a predetermined frequency range that is selected to be about the center frequency of the phase lock detector 44. Thus, the frequency of the reference signal and monitoring signal as transmitted by the transmitter 22 is phase locked to the frequency of returned monitoring signals. If a signal of insufficient amplitude is received by the phase locked detector 44, it will generate a reference signal at its center frequency. Thus, the monitoring signals of this invention tend to direct themselves towards the frequency of the highest amplitude received monitoring signal appearing within the power distribution system. Because of the bandwidth of the phase locked detector 44 is effected by the signal strength, the detector 44 will accept a weaker signal closer to its center frequency and the entire monitoring signal will normally transmit monitoring signals between the center frequency of the detector 44 and the resonant frequency of the signal path as formed by the trailing cables 16, three-phase filter 34, the ground wires, and the common AC power bus 10. As will be explained with respect to FIG. 4, the center frequency and the capture frequency range (corresponding to the aforementioned desired range) of the phase locked detector 44 is determined by the impedance elements including capacitors and resistors connected thereto, as is well known in the art.

The amplified and filtered monitoring signal is also applied, as shown in FIG. 2, to the receiver 20 including an overdriven amplifier 50 which converts the received filtered and amplified monitoring signal nominally in the form of a sine wave to a square wave of a controlled amplifier. The square wave of controlled amplitude is next applied to a step counter or frequency to DC converter 52 which compares the amplitude of the inputted square wave and, if above a predetermined level or amplitude provides a DC signal whose amplitude or level is dependent upon the frequency of the received monitoring signal. The DC signal is applied via a voltage follower 54 which acts as a buffer to a limit comparator 56. The limit comparator redundantly, establishes whether the amplitude of the DC signal as derived from the step counter 52 is within first and second amplitudes corresponding to the lower and upper frequency limits of the desired range of the frequency of the monitoring signal. If outside of the desired frequency range or below the desired amplitude, the limit comparator provides a signal via conductor 23 to deenergize the solenoid 24 whereby the contacts of the power coupling switch 18 are opened. On the other hand, if the limit comparator 56 determines that the frequency of the monitoring signal is within the desired range and of the desired amplitude, its output is applied to energize the solenoid 24 to retain closed the contacts of the coupling switch 18 whereby the mining machine 14 and its load 38 are energized via the trailing cable 16.

In FIG. 4, there is shown a detailed circuit of the low pass filter 40 and the signal amplifier 42 coupled thereto. The monitoring signal as derived from the secondary coil 29 is applied by the conductors 26 and 28 to an operational amplifier 61, which may illustratively take the form of a LM324 as manufactured by the National Semiconductor Company. A varactor Z10 is coupled in parallel between the conductors 26 and 28 and provides a surge protection to protect the operational amplifier and the subsequently connected signal amplifier 42. Resistors R55, R56, R57, and R58, along with capacitors C52, C53, and C55, determine the frequency at which the low pass filter passes input signals. Resistor R57 as coupled between the negative input and output of the operational amplifier 61 determines in part the gain thereof. The output of the active filter 42 thus described is applied via resistor R59 to a signal amplifier 42 in the form of an operational amplifier 52. Resistors R59 and R60 determine the gain of the operational amplifier 62. Resistors R61 and R62 establish a phantom ground at the positive input terminal of the operational amplifier 62 whereby bipolar sine signals may be amplified. The output of the operational amplifier 62 is coupled by coupling capacitor 54 to each of the transmitter 22 and the receiver 20.

The overdriven amplifier 50, the step counter 52, and the voltage follower 54, as shown in functional block diagram of FIG. 2, are shown in detail in the circuit schematic of FIG. 3. In particular, the filtered and amplified monitoring signal is applied via a coupling capacitor C50 and a resistor R50 to the negative terminal of an operational amplifier 59. The operational amplifier 59 amplifies the input signal to provide an amplified square wave output. The gain and threshold of the operational amplifier 59 is set by resistors R50, R51, R52 and variable resistor R53. The threshold level of the operational amplifier 59 may be set by varying the tap of the variable resistor R53. In turn, the amplified square wave output of the operational amplifier 59 is applied via coupling capacitor C51 to the step counter 52 comprised of a pair of diodes CR51 and CR52, capacitor C52, and resistor R53. As is well known in the art, the circuit arrangement of the step counter 52, as shown in FIG. 3, operates to charge the capacitor C52 to a voltage dependent upon the frequency of the inputted signal as applied via coupling capacitor C51. More specifically, during the positive cycle of the inputted square wave signal, diode CR52 is forwardly biased to charge the capacitor C52. During the negative cycle, diode CR52 is back biased permitting the capacitor C52 to discharge through resistor R53, the degree of discharge being proportional to the frequency of the inputted square wave signal. Thus, the voltage to which the capacitor C52 is charged is dependent upon the frequency of the inputted square wave signal. The DC output signal of the step counter 52 as derived from capacitor C52 is applied to the voltage follower 54 in the form of an operational amplifier 60 which performs the function of isolating or buffering the step counter 52 from the limit comparator circuit 56. In particular, the operational amplifier 60 presents a high impedance to the capacitor C52 whereby it will not be discharged therethrough.

The limit comparator 56 generally shown by the functional block diagram of FIG. 2 is shown in detail by the schematic circuit diagram of FIG. 5. The DC signal as derived via the voltage follower 54 from the step counter 52 is applied, as shown in FIG. 5, to the plus terminals of limit comparators 62a and 64a and to the negative terminals of limit comparators 62b and 64b. The limit comparators 62a and 62b form a first pair, each of whose outputs are applied through diodes CR55 and CR56, respectively, and a resistor R66 to the base of a transistor Q7. Similarly, limit comparators 64a and 64b form a second pair, each of whose output is applied through a diode CR57 and CR58, respectively, and a resistor R67 to the base of a transistor Q8. The limit comparators may illustratively take the form of the integrated circuit as manufactured by the National Semiconductor Company under their designation LM-339. Each of the transistors Q7 and Q8 are connected in parallel with each other and with the coil energizing the solenoid 24. A diode CR54 provides a surge or spike protection with respect to the solenoid 24. A biasing voltage V+ is applied via resistor R56 to the emitter of transistor Q7 and to the collector of transistor Q8. Each pair of limit comparators 62 and 64 compare the input DC signal with respect to first and second voltage levels corresponding to the upper and lower frequency levels to determine whether the frequency of the inputted monitoring signal is within the desired range. In particular, as shown in FIG. 5, the V+ supply voltage is supplied through a resistant bridge formed of series connected resistors R61, R62, and R63 to ground. A similar biasing circuit is formed by the resistant bridge comprised of resistors R70, R71, and R73. The voltage appearing at the point of interconnection between resistors R61 and R62 defines the upper voltage and thus frequency limit and is applied to the plus terminal of the limit comparator 62b. The point of interconnection between resistors R62 and R63 defines the lower voltage limit or level corresponding to the lower frequency level and is applied to the negative terminal of the limit comparator 62a. As is well known in the art, the values of the resistors R61, R62, and R63, as well as the potential level of the supply voltage V+, determine the upper and lower limits as applied to the limit comparators 62a and b. In similar fashion, the upper voltage limit is taken from the point of interconnection between resistor R70 and resistor R71 and is applied to the negative terminal of operational amplifier 64a, whereas the voltage taken from the point of interconnection between resistors R71 and R72 defines the lower limit and is applied to the plus terminal of the limit comparator 64b.

As shown in FIG. 5, the V+ supply voltage is applied through a transistor Q9 to the collector of transistor Q7, whose emitter is coupled to energize the solenoid 24. The base of transistor Q9 is coupled through resistor R74 to the emitter of transistor Q8 and to ground. In turn, the collector of transistor Q8 is coupled to the solenoid 24 and, as shown in FIG. 5, is considered to be coupled in parallel with respect to and upon being rendered conductive serves to short the energizing coil of the solenoid 24. The transistor Q7 is coupled in series between the V+ supply voltage and the solenoid 24, and upon being rendered conductive, applies the V+ supply voltage to the energizing coil of the solenoid 24. The transistor Q9 is rendered non-conductive if the path from its base to ground, as well as the path from the emitter of transistor Q8 to ground, is broken. In that case, transistor Q9 will be rendered non-conductive thus preventing the energization of the solenoid 24. As shown in FIG. 5, the solenoid 24 as well as the diode CR54 are disposed on a separate circuit board from that of transistors Q7 and Q8 and are interconnected by pin connector having contacts 65a and 65b. It is contemplated that in the absence of transistor Q9 if pin 65b was opened and pin 65a was closed, thereby breaking the ground connection to emitter transistor Q8, the +V supply voltage could be applied to the solenoid 24 thus defeating the failsafe requirements of this apparatus. The provision of transistor Q9 insures that if the ground connection is broken, the transistor Q9 will remain deenergized and the +V supply voltage cannot be connected in circuit to energize the solenoid 24.

In operation, the DC signal indicative of the frequency of the received monitoring signal is applied to the first pair of limit comparators 62a and 62b. If the frequency of the detected monitoring signals is out of the desired frequency range or the amplitude is below the required level, one of the limit comparators 62a and 62b will provide a low or zero signal at its output. As shown in FIG. 5, a +V voltage is applied by resistor R64 to forward bias each of the diode CR55 and CR56 if the output upon its limit comparator 62 goes low or zero as when the output of one of the limit comparators 62 goes low indicating that the amplitude is low or the frequency of the received monitoring signal is out of the desired range, whereby the voltage applied through resistor R66 to the base of transistor Q7 is pulled toward ground thereby rendering transistor Q7 non-conductive to deenergize solenoid 24 and to open the contacts of the coupling switch 18. On the other hand, if the amplitude is sufficient and the frequency is within the desired range, each of the limit comparators 62a and b provides a high or one output thereby tending to back bias its diode CR55 or CR56 and to raise the potential applied to the base of transistor Q7 rendering transistor Q7 conductive and applying the V+ supply voltage through the normally conductive transistor Q9 to maintain the solenoid 24 energized, and the contacts of the coupling switch 18 closed. By contrast, the limit comparators 64a and 64b provide, if the frequency of the monitoring signal is out of the desired range or the amplitude is low, a high or one signal tending to forward bias its diode CR57 or CR58, respectively, whereby the +V voltage is applied through either its resistor R68 or resistor R69, and resistor R67 to raise the potential applied to the base of transistor Q8 rendering transistor Q8 conductive, deenergizing the solenoid 24, and opening the contacts of the coupling switch 18. By contrast, if the frequency of the monitoring signal is within the desired range and the amplitude is sufficient, the limit comparators 64a and 64b each provide a low or zero output, whereby the voltage applied to the base of transistor Q8 tends to be drawn toward ground rendering transistor Q8 non-conductive, the solenoid 24 energized, and the contacts of the coupling switch 18 closed.

Referring now to FIGS. 6A and B, there is shown a detailed circuit schematic of a further embodiment of this invention. Generally, the numbers used to designate the elements in FIG. 6 are similar to those used in the remaining figures except that they are in the hundred series. In particular, there is shown a power circuit and relay 170 including a control switch 208b for connecting the AC signal through fuse F1 to the primary of transformer T2. A surge suppressor in the form of a varactor Z3 protects the power supply from voltage spikes and transients, as may appear on the 120 VAC line. Rectifier bridge 172 supplies direct current to filter capacitors C27 and C30. A regulated DC supply voltage (B+) is provided using the network including resistors R28 and R29, transistors Q5 and Q6, capacitor C28, and integrated circuit voltage regulator 174 connected as shown. Regulator 174 can be an MC 1469R as manufactured by Motorola. During normal operation of power supply 170 when the output load draws current somewhat less than the maximum output of the power supply, some of the current supplied to output conductor 176 is along the leg including resistor R31 and transistor Q5, and some of the current if from voltage regulator 174 through resistor R30. At operation near the maximum current output of the power circuit 170, the ratio of the current from transistor Q5 to the current from voltage regulator 174 is on the order of 12 to 1. When the output current drawn by the load is very low, this ratio can decrease. Regulation of the output voltage by power circuit 170 is excellent despite variations of AC supply line voltage. This power circuit 170 has the capability of producing a constant DC voltage even if the supply line voltage drops to 60 percent of its normal voltage. The regulated output is selectively applied, as will be explained, via line 178 to energize light emitting diodes (LED) 180a, 180b, and 180c for providing when lit indications that the monitoring system of FIGS. 6A and B, is in its receive, transmit, and fault modes, respectively.

The regulated output is also applied, as shown in FIGS. 6A and B via line 176 to energize the transmitter 122 and the receiver 120. The monitoring signal from current transformer 129 passes to receiver 120 over lines 126 and 128. A surge suppressor in the form of a varactor Z2 protects the circuitry of receiver 120 from large voltage spikes which may be coupled from transformer 129. The first stage of the receiver 120 takes the form of a passive filter disposed between lines 126 and 128 and comprised of resistors R8, R9, and R10, and capacitors C9 and C10. This passive filter acts to pass those signals having a frequency below approximately 4.1 kHz and to attenuate those signals having a frequency thereabove. The oppositely poled diodes CR1 and CR2 and capacitor C11 are coupled in parallel across lines 126 and 128 and serve to clip high amplitude spike or surge signals as may be imposed thereacross. A second stage of receiver 170 provides amplification of the filtered signal and is comprised essentially of an operational amplifier 129 that may illustratively take the form of an integrated circuit as manufactured by the National Semiconductor Company under their designation LM741. A phantom ground is provided by the resistors R13 and R15, as well as capacitor C41, whereby bipolar sine wave signals may be amplified. Resistors R11, R14, and R16 determine the gain of the operational amplifier 129, noting that variable resistor R16 may be adjusted to vary the gain of the operational amplifier 129. Further, resistor R12 is disposed between the plus and negative input terminals of the operational amplifier 129 to provide failsafe protection. The second stage of receiver 120 amplifies the 4.1 kHz monitoring signal and applies its output via line 182 to a pair of parallel connected phase locked loop frequency discriminators 184 and 186 through the coupling capacitors C30a and b, respectively.

Figure 6B:
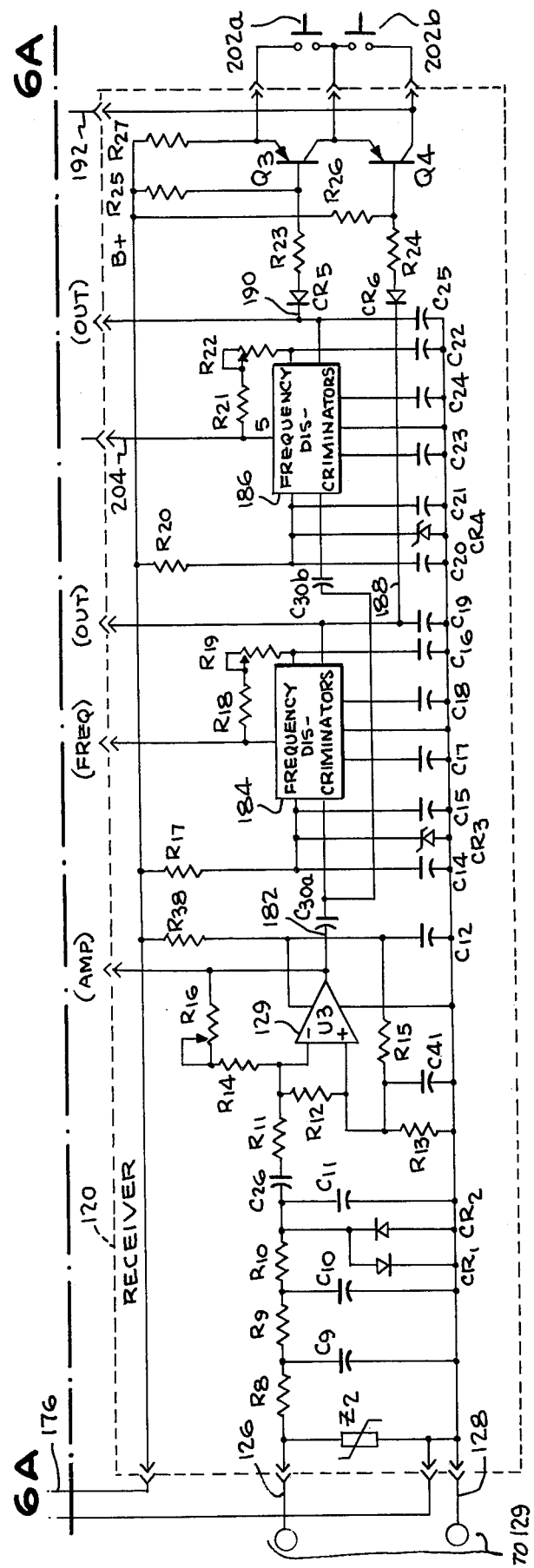
FIGS. 6A and B show a detailed circuit diagram of a further embodiment of the monitoring system of this invention as generally shown in the functional block diagram of FIG. 1.

Each of the phase locked loop frequency discriminators 184 and 186 is contained within an integrated circuit such as an LM 567 CN available from National Semiconductor Company. When the discriminators 184 and 186 are connected, respectively, as shown in FIG. 6B, with capacitors C16 and C22, C17 and C23, and C18 and C24, with variable resistors R19 and R22, and with resistors R18 and R21, each will track the signal frequency even if there is variation of up to about ±4% from the center frequency of 4.1 kHz. The phase locked loop frequency discriminators 184 and 186 provide low level outputs on lines 188 and 190, respectively, as long as the discriminators 184 and 186 are locked into a signal of sufficient amplitude and of proper frequency that is within the capture or desired range of frequencies of the phase locked loops. When the incoming signal frequency deviates beyond the tracking range of either discriminators 184 and 186, or when the signal level drops below the level detectable by the discriminators, indicating a fault is present in its trailing cable or elsewhere in the monitor system, a high output is produced by each discriminator on its respective lines 188 and 190. DC voltage supplied to the discriminators 150 and 152 from the power circuit and relay 170 via line 176 is regulated by the two networks which include resistors R17 and R20, zener diodes CR3 and CR4, and capacitors C14, C15, C20, and C21 to provide immunity to varying supply voltage conditions.

The receiver 120 also includes a transistor output stage comprised of series connected transistors Q3 and Q4, as will be discussed in detail below, which energize, via line 192, a relay 194 (see FIG. 6A) having contacts 196 and 198, and a coil 200. Normally open contact 198 provides a continuous current path from relay voltage supply $V_R$ via conductor 123 to maintain solenoid 124 energized and its coupling switch 118 closed so long as the coil 200 is energized. Coil 200, when energized, maintains contact 196 open so that LED 180a is not energized. When a fault condition exists, coil 200 is deenergized, contact 198 opens so current from supply $V_R$ as applied via conductor 123 to the solenoid 124 is interrupted, coupling switch 118 opened, and the AC power is disconnected from conductors 116-1, 116-2, and 116-3. Also the contact 196 closes to energize the LED 180c indicating the existence of a fault condition, i.e., either an open or short circuit condition within the trailing cable 116.

The receiver output stage includes two PNP transistors Q3 and Q4. The base of transistor Q4 is held at a voltage between the B+ supply voltage and the voltage presented on line 188 by the voltage divider, including resistors R24 and R26. A similar voltage divider, including resistors R23 and R25, is provided for the base of transistor Q3.

In operation, when a monitor signal of proper amplitude and frequency is received at the receiver 120, the phase locked loop discriminators 184 and 186 lock into the signal, and their outputs on lines 188 and 190 are at a low level. As a result, the voltages at the base of transistors Q4 and Q3 cause the transistors to conduct and energize relay coil 200. Contact 198 then provides a current path from supply $V_R$ to solenoid 194 to maintain the switch 118 closed and to connect the conductors 116-1, 116-2, and 116-3 to the AC power bus 110. In the event of a serious fault in the ground or conductor system, the signal at the receiver 120 drops below a predetermined level. Discriminators 184 and 186 can no longer track the signal and their outputs 188 and 190 go to their high state. The voltages at the bases of transistors Q3 and Q4 increase and cause the transistors to cut-off. Current to the relay coil 200 is cut-off and the coupling switch 118 opens removing AC power from the conductors 116-1, 116-2, and 116-3. Relay coil 200 also closes the contact 196 which energizes the LED 180c indicating a fault condition.

To prevent nuisance tripping of the coupling switch 118 due to the brief presence of intermittent noise, a suitable time delay is built into the system using capacitors C19 and C25. The time necessary to turn off transistors Q3 and Q4 when a fault occurs is determined by the time required to charge either capacitors C19 or C25 from the low state to a higher level which causes either of transistors Q3 or Q4 to become non-conductive.

As is evident from the circuit of FIG. 6, current will cease to flow from the output stage to relay coil 200 after the delay period when either of output lines 188 or 190 passes to its high state. Therefore, should either discriminator 184 or 186 fail to operate properly, the remaining discriminator will still operate to cause coil 200 to become deenergized upon occurrence of a fault in its trailing cable 116. The parallel connected discriminators 184 and 186 thus guard against failure of each other and prevent the operation of the coupling switch 118 even if one of the discriminators malfunctions so its output is locked in the low state. Momentary contact switches 202a and b may be used to bypass either transistor Q3 or Q4 to test the operation of each parallel-connected discriminator. If a monitor signal of proper frequency and amplitude is not received at the receiver 120, the closing of one of the switches 202a or b to momentarily short circuit either transistor Q3 or Q4 will not energize relay coil 200 unless one of the discriminators is faulty and locked at its low output level.

As shown in FIG. 6A, the supply voltage B+ is applied from the power circuit and relay 170 via conductor 176 to the transmitter 122, whereby a monitoring signal, as will be explained, is generated and applied via conductor 129 and the three phase filter 134 to be transmitted via the trailing cable 116 to the mining machine. In accordance with the teachings of this invention, no separate wave generator is required within the transmitter 122; rather, a reference signal or tone is derived from pin 5 of the frequency discriminator 186 (see FIG. 6B) and is applied to the transmitter 122 to generate the monitoring signal, as will be explained in detail below. In an illustrative embodiment of this invention, as discussed above, the frequency discriminators 184 and 186 take the form of an integrated circuit such as the LM 567 CN available from National Semiconductor Company, which provides at its pin 5 a signal at the center frequency of the desired range detected by the discriminator 186, e.g., a frequency of approximately 4.1 kHz. This tone or reference signal is applied by conductor 204 through coupling capacitor C38 and resistor R3 to an input terminal of operational amplifier 206. The output of the operational amplifier 206 is coupled via resistor R6 to the base of transistor Q1 and through resistor R7 to the base of transistor Q2, whose emitters are tied together to provide a common output in a push-pull arrangement as is well known in the art. In turn, the common output of transistors Q1 and Q2 is coupled to the primary winding of the transformer T1. A surge suppressor in the form of a varactor Z1 is connected across the input terminals of the aforementioned primary winding. The transformer T1 includes a secondary winding that is coupled between ground and the output conductor 129, which applies the generated monitoring signal via the three-phase filter 34 to the trailing cable 116. A resistance R37 is coupled between the conductor 129 and the secondary winding of the transformer T1, and a test switch 208a is coupled to provide a short circuit thereacross. In the on or off position, the switch 208a serves to short circuit the resistors R37 and to apply the monitoring signal directly to the three phase filter 134. If the transmitter 122 is operating satisfactorily, the amplified monitoring signal is applied to a frequency discriminator 208 of a type similar to that of frequency discriminators 184 and 186 and similarly interconnected as previously explained. If the reference tone, as derived from the frequency discriminator 186, is of a selected amplitude and within the desired frequency range, the frequency discriminator 208 will provide an output signal to energize the LED 180b indicating, upon its being lit, that a reference tone, and thus a monitoring signal, of appropriate amplitude and frequency is being transmitted.

The operating switch 208 is divided in two parts as shown in FIG. 6A, a first part serving to couple 120 volts to the input transformer T2, and the second part 208a to short circuit the test resistor R37. The resistor R37 is connected at the output of the transmitter 122 to provide a high impedance path for the monitoring signal when the normally closed test switch 208a is opened, i.e., is disposed to its test position. Upon opening the test switch 208a, the amplitude of the monitoring signals is reduced to a level below that which the discriminators 184 and 186 within the receiver 120 can track, and as a result, the solenoids 194 and 124 are deenergized, and the contacts of the coupling switch 118 opened. Deenergizing the solenoid 194 causes contact 196 to move to its contact 196b to energize the fault LED 180c. If one of the switches 202a or 202b is closed, an indication is provided of which one of the parallel phase locked loop discriminators 184 and 186 (and/or associated output circuits) has failed.

Thus, in accordance with the teachings of this invention, the returned monitoring signals are applied via either the interconnecting power bus 110 or the ground wire of the trailing cable 116 to the receiver 120, whereby a reference tone that is frequency locked to the received monitoring signal is developed and applied to the conductor 204. As a result, the frequency of the signal as generated by the transmitter 122 tends to phase lock to the frequency of the returned monitoring signal thus preventing the generation of beat signals. If a signal of insufficient amplitude is received by the receiver 122, its phase lock detector 186 will transmit a signal at its center frequency. Thus, the entire system tends to tune itself for the highest amplitudes received monitoring signal.

Numerous changes may be made in the above-described system and different embodiments of the invention may be made without departing from the spirit thereof; therefore, it is intended that all matter contained in the foregoing description and the accompanying drawings shall be interpreted as illustrative and not in a limiting sense.

I claim:

1. A conductor continuity monitoring system for monitoring the continuity of a plurality of cables, each of said cables extending from a common power source to a corresponding one of a plurality of loads to be energized, said monitoring system comprising:
    (a) a plurality of transmitter means, each of said transmitter means transmitting a monitoring signal of predetermined amplitude and frequency to and from a corresponding one of said plurality of loads via a corresponding one of said plurality of cables;
    (b) a plurality of receiver means, each of said receiver means receiving monitoring signals returned via a corresponding one of said plurality of cables and via said common power source and determining whether the received monitoring signals are within a predetermined frequency range and above a predetermined amplitude to provide a manifestation indicative thereof, one of said plurality of transmitter means and of receiver means being coupled to one end of said one corresponding cable and said corresponding one load being coupled to the other end of said one corresponding cable; and
    (c) a plurality of reference means, each associated with each of said plurality of cables and with a corresponding one of said plurality of transmitter means and responsive to the frequency of the received monitoring signals for generating a reference signal of a frequency substantially equal to the frequency of the received monitoring signals, each of said plurality of transmitter means responsive to said reference signal of said corresponding one of said plurality of reference means for transmitting its monitoring signal at substantially the same frequency as that of the other monitoring signals as transmitted by the other of said plurality of transmitter means, whereby said plurality of monitoring signals as transmitted over said plurality of cables are of substantially the same frequency and as a result no difference signals are produced as would result from frequency shifts being imposed on other ones of said monitoring signals as appear on said plurality of cables and said common power source.

2. The conductor continuity monitoring system as claimed in claim 1, wherein coupling switch means is associated with each of said cables and is operative in a closed state for interconnecting said common power source to its cable and in an open state for disconnecting said common power source from its cable, said coupling switch means operative in the absence of said manifestation as derived from the corresponding one of said plurality of receiver means in its open state and in the presence of said manifestation in its closed state.

3. The conductor continuity monitoring system as claimed in claim 1, wherein each of said reference means comprises a phase locked detector circuit responsive to the returned monitoring signals for phase locking the frequency of its reference signal to that of the returned monitoring signals.

4. The conductor continuity monitoring system as claimed in claim 3, wherein each of the phase locked detectors is incorporated within a corresponding one of said plurality of transmitting means and each of said transmitting means is coupled to its cable to receive monitoring signals therefrom.

5. The conductor continuity monitoring system as claimed in claim 4, wherein each of said plurality of cables comprises a plurality of power conductors and a ground wire extending from said common power source to its load, each of said transmitter means coupled to transmit its monitoring signal via said plurality of conductors of its cable to its load, said load connected to said ground wire of its cable, said receiver means being coupled to said ground wire of its cable for applying the returned monitoring signal to said reference means of its corresponding transmitter means.

6. The conductor continuity monitoring system as claimed in claim 2, wherein each of said plurality of receiver means comprises first means responsive to the received monitoring signal for determining whether the amplitude of the received monitoring signal is above a predetermined amplitude and second means responsive to the received monitoring signals for determining whether the frequency thereof is within a desired range.

7. The conductor continuity monitoring system as claimed in claim 6, wherein said second means comprises converter means responsive to the frequency of the received monitoring signal for providing a DC output signal whose amplitude is dependent thereon, and limit comparator means for receiving and comparing the DC output signal with first and second voltage levels corresponding to the limits of the desired frequency range to provide the manifestation if within the desired range.

8. The conductor continuity monitoring system as claimed in claim 7, wherein said limit comparator means comprises at least a pair of comparator circuits, each for receiving the DC output signal and for comparing the DC output signal for providing an output signal if below the higher limit and above the lower limit, and switch means responsive to each of the output signals of said pair of comparator circuits for operating said coupling switch means in its closed state.

9. The conductor continuity monitoring system as claimed in claim 8, wherein there is further included a second, redundant pair of comparator circuits coupled to receive the DC output signal of said converter means and for comparing the DC output signal with the first and second voltage levels corresponding to the upper and lower frequency of the desired range and to provide a second output signal if below the higher level and above the lower level, and second switch means responsive to the second output signal, said first mentioned and second switches for operating said coupling switch means in its closed state, means operative in the absence of the first mentioned and second output signals for operating said coupling switch means in its open state.

10. The conductor continuity monitoring system as claimed in claim 9, wherein said first and second switch means are connected in parallel with each other, said coupling switch means including a solenoid connected in parallel with each of said first and second switch means whereby if either of said first and second switch means is rendered conductive, said conductive switch means provides a short circuit about said solenoid thereby deenergizing said solenoid.

11. The conductor continuity monitoring system as claimed in claim 2, wherein said reference means is incorporated within each of said plurality of receiver means, said reference means operative in a first function for providing said reference signal and in a second function for providing the manifestation indicative that the frequency of the returned monitoring signals is within the desired range and that its amplitude is above the predetermined level.

12. The conductor continuity monitoring system as claimed in claim 11, wherein there is included a second reference means connected in parallel with said first mentioned reference means for providing a second manifestation indicative that the frequency of the returned monitoring signal is within the desired range and above the predetermined level.

13. The conductor continuity system as claimed in claim 12, wherein there is included first and second switch means coupled in series with each other for applying an energizing signal to said coupling switch means to operate it in its closed state, each of said first and said second switch means being coupled, respectively, to said first mentioned and said second reference means and in response to both of the first mentioned and second manifestations to operate said coupling switch means in its closed state and in the absence of either of the first mentioned and second manifestations to operate said coupling switch means in its open state.

* * * * *